(12) United States Patent  
Morris et al.

(10) Patent No.: US 6,732,893 B2  
(45) Date of Patent: *May 11, 2004

(54) SELF-LOCKING BICYCLE CARRIER

(75) Inventors: James C. Morris, Penticton (CA); Lopin Wang, Taichung (TW); Donald E. Schlenker, Penticton (CA)

(73) Assignee: Danik Industries, Ltd., Penticton (CA)

( * ) Notice: Subject to any disclaimer, the term of this patent is extended or adjusted under 35 U.S.C. 154(b) by 133 days.

This patent is subject to a terminal disclaimer.

(21) Appl. No.: 09/871,317

(22) Filed: May 30, 2001

(65) Prior Publication Data

US 2002/0003156 A1 Jan. 10, 2002

Related U.S. Application Data

(63) Continuation-in-part of application No. 09/209,928, filed on Dec. 9, 1998, now Pat. No. 6,321,962.

(51) Int. Cl.[7] ................................................. B60R 9/06
(52) U.S. Cl. ..................... 224/537; 224/502; 224/532; 224/553; 224/558; 224/571; 224/924
(58) Field of Search .......................... 224/488, 502–509, 224/532, 533, 536, 537, 553, 558, 567, 570, 571, 924; 403/359.1, 383, 396, 398, 400; 248/218.4, 219.1, 230.4

(56) References Cited

U.S. PATENT DOCUMENTS

| 610,132 A | 8/1898 | Goodridge |
| 1,742,450 A | 1/1930 | Riemenschneider |
| 1,854,946 A | 4/1932 | Loring |
| 4,234,112 A | 11/1980 | Gallant |
| 5,092,504 A | 3/1992 | Hannes et al. |
| 5,109,411 A | * 4/1992 | O'Connell ................... 224/553 |
| 5,195,670 A | 3/1993 | Piretti et al. |
| 5,259,542 A | 11/1993 | Newbold et al. |
| 5,284,282 A | 2/1994 | Mottino |
| 5,332,134 A | 7/1994 | Chen |
| 5,495,970 A | 3/1996 | Pedrini |
| 5,505,357 A | 4/1996 | Chimenti et al. |
| 5,509,751 A | 4/1996 | Keller |
| 5,573,165 A | 11/1996 | Bloemer et al. |
| 5,598,960 A | 2/1997 | Allen et al. |
| 5,775,555 A | 7/1998 | Bloemer et al. |
| 5,857,602 A | 1/1999 | Depot |
| 5,992,720 A | 11/1999 | Miller |
| 6,164,506 A | * 12/2000 | Wu ............................. 224/274 |
| 6,234,372 B1 | * 5/2001 | Rivera ......................... 224/497 |
| 6,283,349 B1 | * 9/2001 | Morris et al. ................ 224/502 |
| 6,286,738 B1 | * 9/2001 | Robins et al. ............... 224/314 |
| 6,371,235 B1 | * 4/2002 | Wisecarver .................. 180/208 |

* cited by examiner

*Primary Examiner*—Stephen K. Cronin  
(74) *Attorney, Agent, or Firm*—Blakely Sokoloff Taylor & Zafman LLP

(57) ABSTRACT

A carrier comprised of a holding member and an article support member. The holding member includes a tubing with a plurality of grooves lengthwise down the tubing. The article support member is coupled to the holding member. The article support member includes a tray and a collar. The collar engages and interlocks with orientation grooves associated with the holding member. The collar enables the tray to be rotatably adjusted with a slope in accordance with a selected angular orientation of the plurality of angular orientations without the presence of an article in the tray.

20 Claims, 7 Drawing Sheets

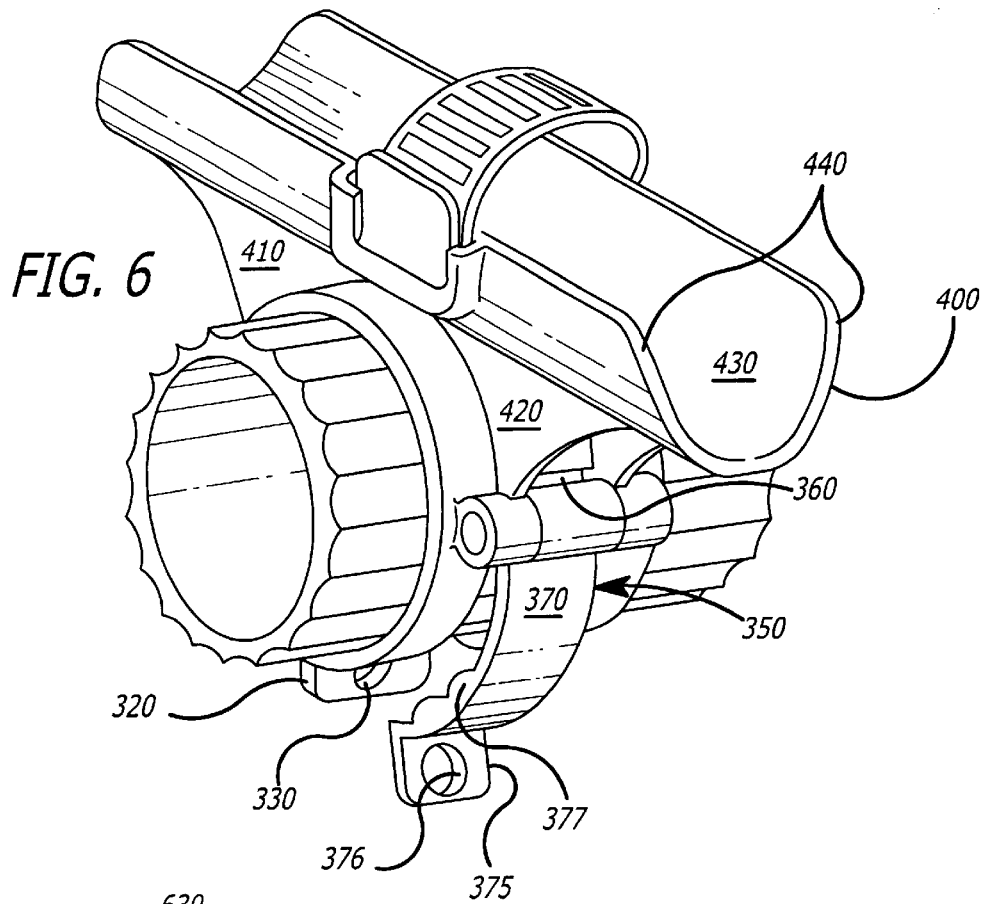
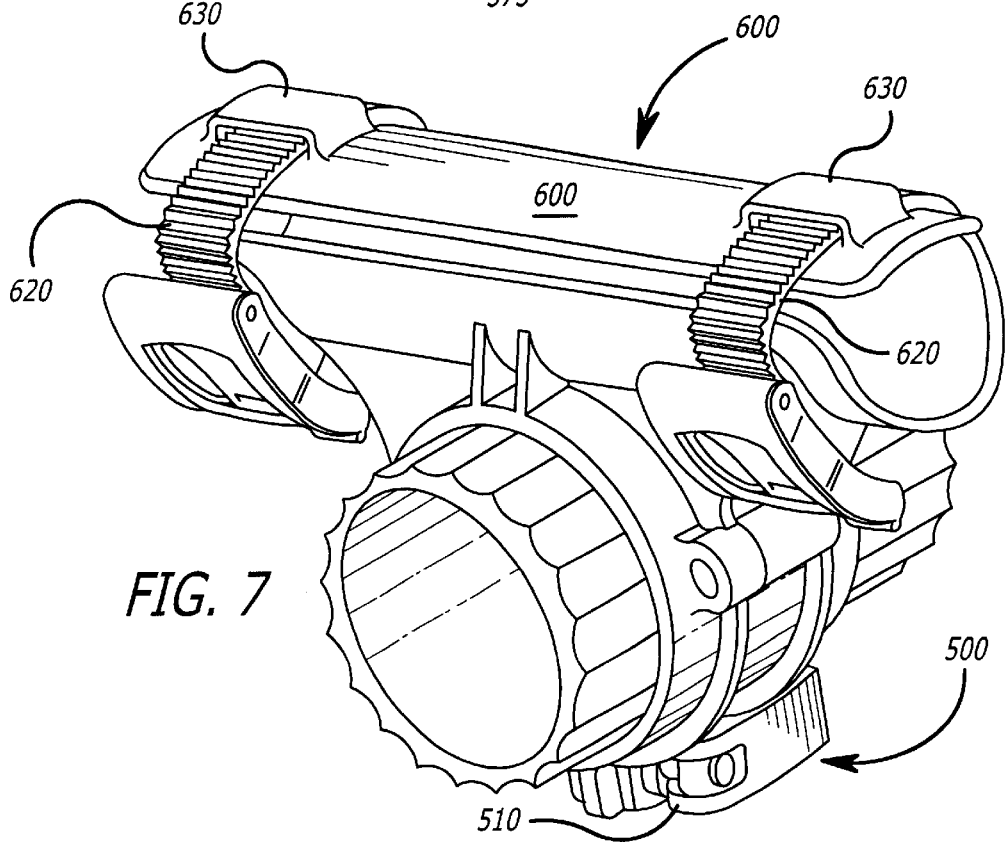

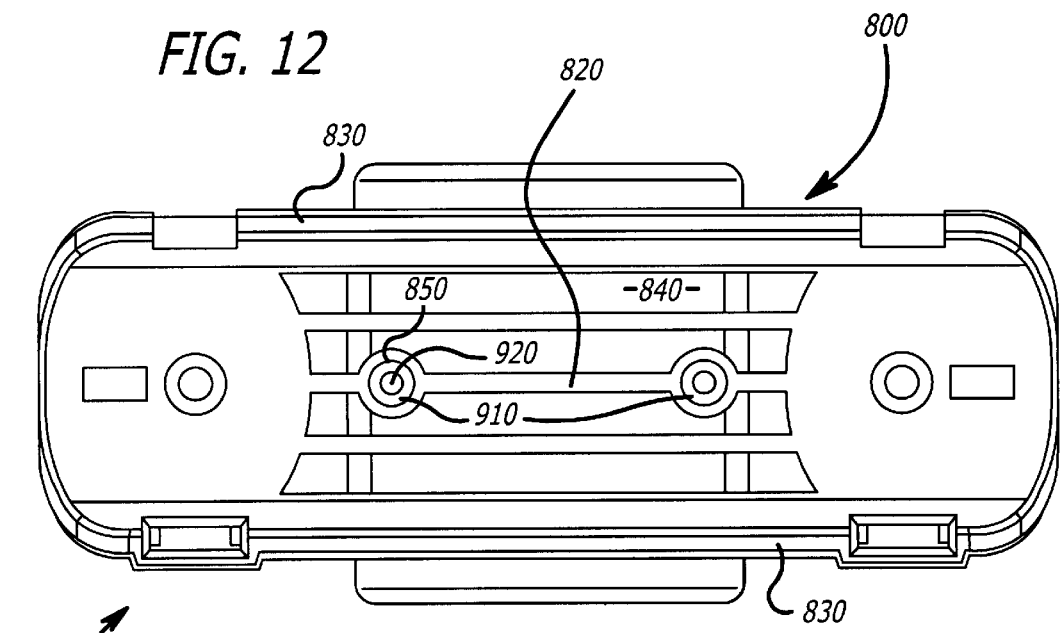
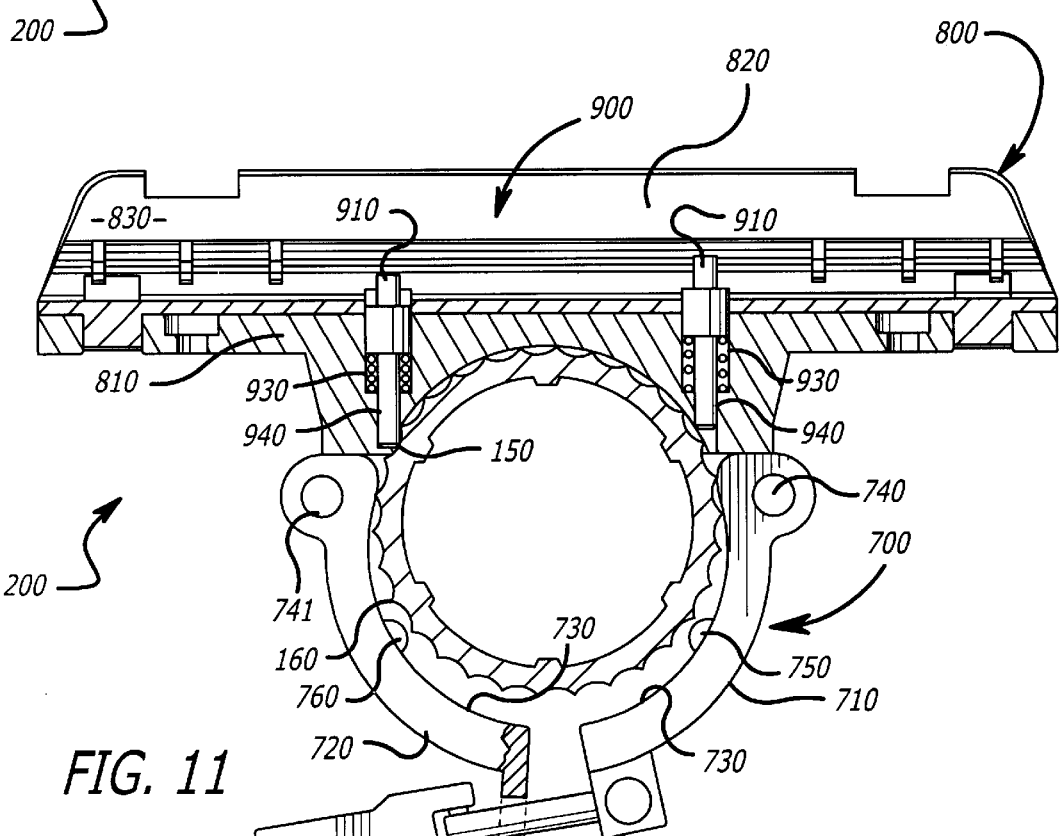
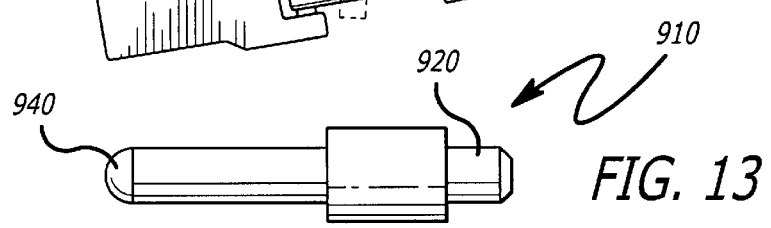

SELF-LOCKING BICYCLE CARRIER

CROSS-REFERENCES TO RELATED APPLICATIONS

This is a Continuation of a Continuation-in-Part of U.S. patent application Ser. No. 09/209,928 filed Dec. 9, 1998 which has matured to U.S. Pat. No. 6,321,962.

BACKGROUND

1. Field of the Invention

The present invention relates to the field of bicycle carriers. In particular, the present invention relates to a carrier and adjustable article support members to secure bicycles during transport.

2. General Background

For many years, a substantial majority of bicycle frames have been manufactured with a generally horizontal top tube, which is connected to the seat tube and the head tube of the frame. In light of these features, rear-mounted bicycle carriers have been designed to hold the top tube of a bicycle frame during transport. For example, both U.S. Pat. No. 4,646,414 and U.S. Pat. No. 5,190,195 disclose standard rear-mounted bicycle carriers, each employing a pair of horizontal, hook-like arms to support the top tube of a bicycle frame. In addition, U.S. Pat. Nos. 5,529,231 and 5,647,521 disclose a rear-mounted bicycle carrier having a horizontal support member upon which V-shaped frame holders are permanently affixed. A single clamping mechanism, when fastened, is used to secure all of the bicycles placed on the V-shaped frame holders. The clamping mechanism is incapable of securing individual bicycles.

It is evident, however, that these rear-mounted bicycle carriers are unable to easily accommodate bicycles with sloped top tubes, which are usually found in ladies' bicycles and in an increasing number of mountain and racing bicycles. Normally, bicycles having sloped top tubes (generally referred to herein as "sloped tube bicycles") rest in an awkward, unstable position when transported by conventional rear-mounted bicycle carriers. This awkward position can cause damage to the bicycle or cause the bicycle to become partially or completely dislodged from the carrier during transit.

In addition, conventional rear-mounted bicycle carriers are designed so that the spatial distance between bicycle frames placed on the carrier is constant and non-modifiable. This is problematic when bicycles are upgraded with components that increase the width of the bicycle. For example, a bicycle with front-fork shock absorbers would require more spacing between neighboring bicycles than a conventional bicycle. If the additional spacing cannot be provided, some of the bicycles being transported can become damaged.

Recently, various companies have attempted to develop bicycle carriers for sloped top tubes. However, these carriers employ brackets designed with a conventional pressure-based locking mechanism relying solely on a locking handle (or cam). This type of locking mechanism raises safety concerns because there is no secondary locking mechanism to prevent the bicycles from rotating if the locking handle is loosened intentionally or accidentally. This constitutes a safety concern. Also, this locking mechanism supports rotational adjustment of the bracket when the bicycle is attached, which would encourage users to conduct difficult manipulations of the brackets and bicycles that would likely result in injury to the user or damage to the bicycle.

Hence, it is desirable to provide a carrier that allows the spacing between neighboring bicycles placed on the carrier to be adjusted and an article support member that is precluded from further rotation when the article when placed therein.

SUMMARY

Briefly, the present invention relates to a carrier comprising a holding member and an article support member. The holding member includes a tubing with a plurality of grooves length-wise down the tubing. The article support member is coupled to the holding member. The article support member includes a tray and a collar. The collar is coupled to the tray and engages with the holding member in a plurality of angular orientations. In one embodiment, the engagement is accomplished by a fastening mechanism to prevent movement of the article support member upon placement of the article in the tray.

BRIEF DESCRIPTION OF THE DRAWINGS

The features and advantages of the present invention will become apparent from the following detailed description of the present invention in which:

FIG. 6 is an illustrative embodiment of an article support member of FIGS. 2 and 5 before attachment of the collar fastening mechanism.

FIG. 7 is an illustrative alternative embodiment of the article support member of FIG. 6 after attachment of the collar fastening mechanism.

FIG. 11 is a second illustrative embodiment of an article support member of FIG. 2.

FIG. 12 is an illustrative embodiment of a tray of the article support member of FIG. 12.

FIG. 13 is an illustrative embodiment of a pin of the collar fastening mechanism of the article support member of FIG. 12.

DETAILED DESCRIPTION

Herein, an embodiment of a carrier comprising one or more adjustable article support members is shown. Each article support member is designed to accommodate articles with different structures such as, for example, any type of bicycle including sloped tube bicycles of varying tube diameters, wheelchairs and the like. While numerous specific details are set forth in order to provide a thorough understanding of the invention, it is apparent to one of reasonable skill in the art that the invention may be practiced without these specific details. In fact, to avoid unnecessarily obscuring the invention, well known features may not be described herein.

Figure 1:
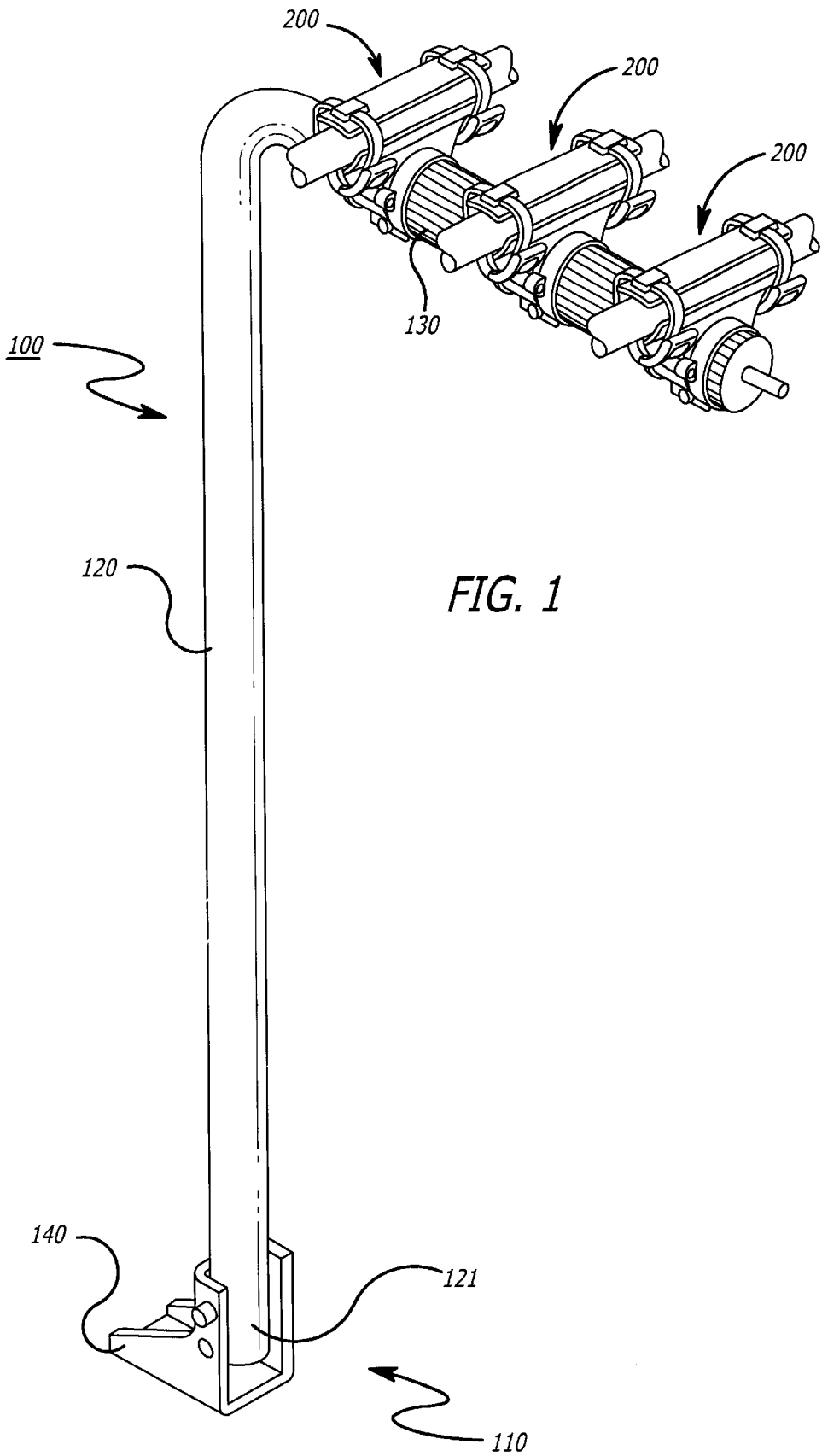
FIG. 1 is an illustrative embodiment of a carrier including adjustable, article support members.

Referring now to FIG. 1, a perspective view of an illustrative embodiment of a carrier 100 comprising a plurality of article support members 200 is shown. Carrier 100 comprises a base member 110, a column member 120 and a holding member 130. In particular, base member 110 is capable of being securely attached to a hitch receiver of a vehicle through a fold-down receiver footing 140. Of course, it is contemplated that carrier 100 may be attached to a bumper or chassis of a vehicle in lieu of the hitch receiver. Also, instead of being attached to a vehicle, carrier 100 may be used as a stationary locking apparatus.

Figure 2:
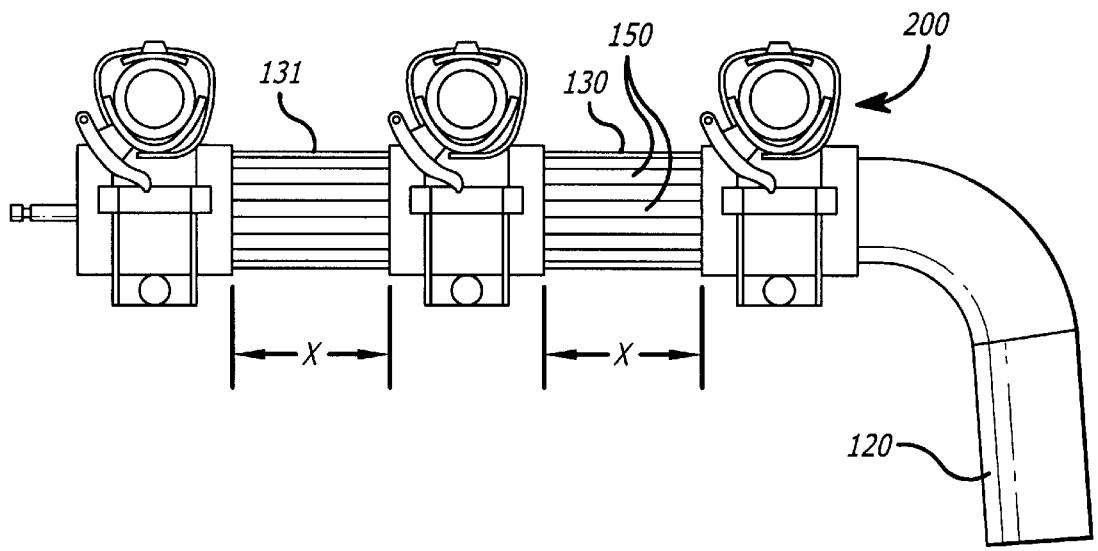
FIG. 2 is an illustrative embodiment of the column and holding members of the carrier of FIG. 1.

As further shown in both FIGS. 1 and 2, column member 120 includes a cylindrical tube having a first end 121 coupled to base member 110 and a second end 122 coupled to holding member 130. In particular, at the first end 121, column member 120 is pivotally coupled to base member 110. This allows column member 120 to be rotated downward for loading and unloading of articles and to remain generally perpendicular to base member 110 during transport. Column member 120 is coupled to holding member 130 at second end 122 as shown in more detail in FIG. 2.

Referring now to FIG. 2, one embodiment of holding member 130 includes a cylindrical tube having an outer surface 131 featuring a plurality of orientation grooves 150 lengthwise across the tube. For this embodiment, orientation grooves 150 are immediately adjacent to each other and placed around a circumference of outer surface 131 (e.g., each groove occupies about one-twentieth of the circumference of holding member 130). This allows a spacing distance (X) between article support members 200 to be adjustable. It is contemplated, however, that grooves 150 may be separated from each other by non-grooved or protruding portions. The separation may be equal distances or varying distances. Also, holding member 130 may be smooth along surface 131 with an insert having cylindrical grooves placed over holding member 130 and securely fastened thereto.

Figure 3:
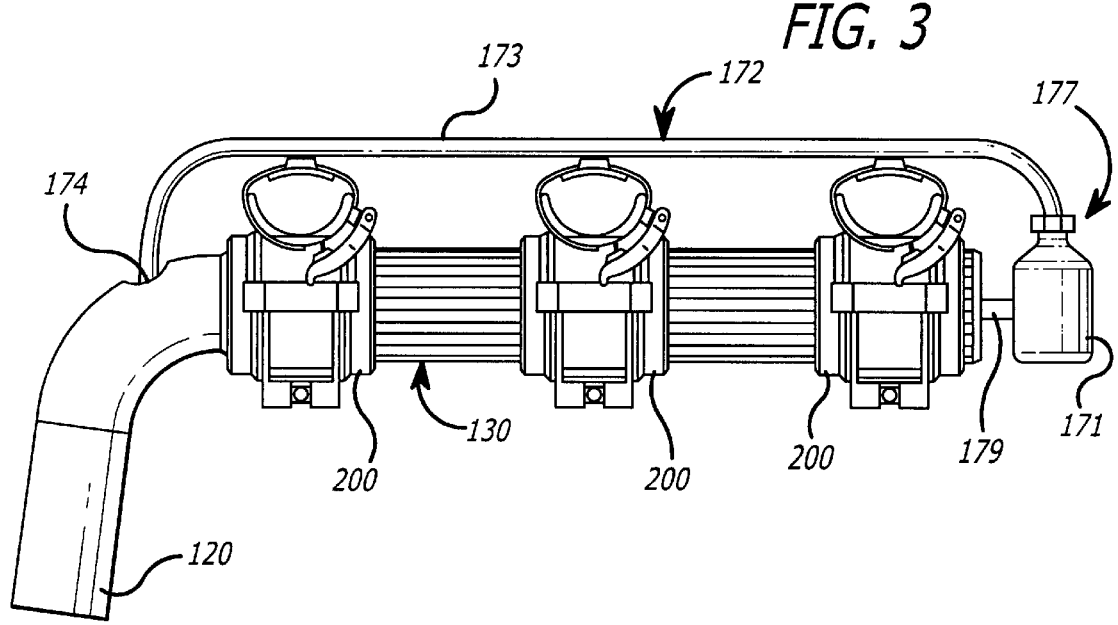
FIG. 3 is an illustrative embodiment of the column and holding members of the carrier of FIG. 1 inclusive of a locking mechanism and article support members.
Figure 4:
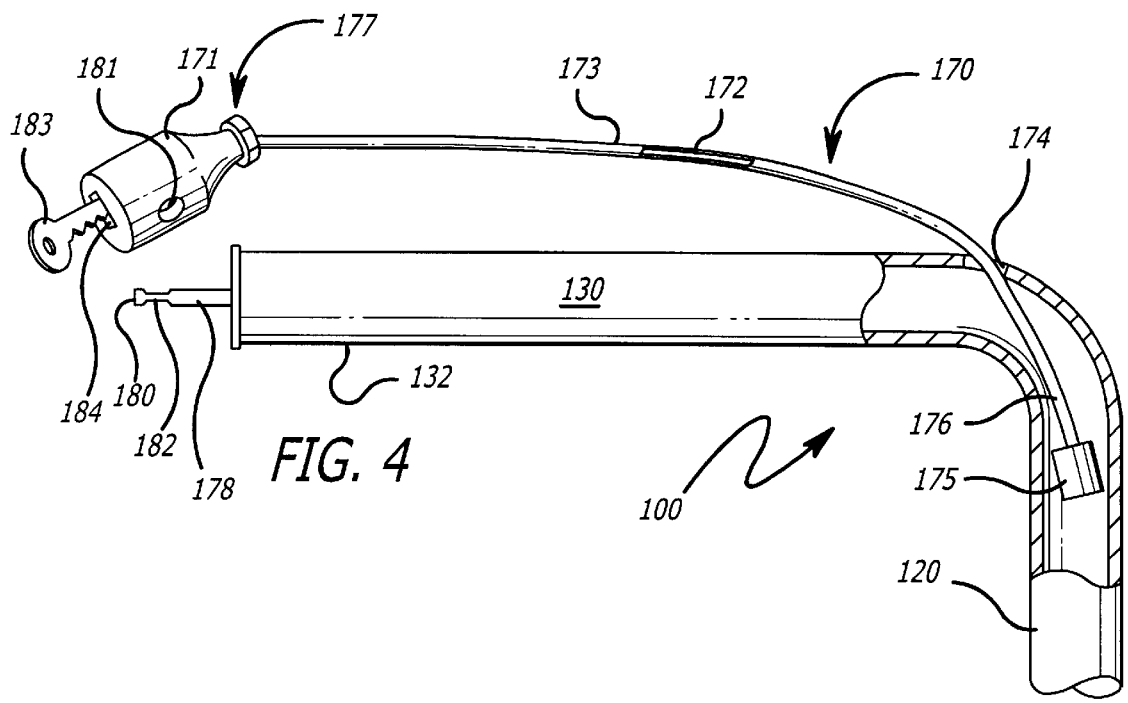
FIG. 4 is a partial cross-sectional view of the illustrative embodiment of the locking mechanism of FIG. 3.

Referring now to FIGS. 3 and 4, in this embodiment, an integral, locking mechanism 170 is implemented within carrier 100. As shown, locking mechanism 170 includes a cable lock 171 placed at the end of locking cable 172. Locking cable 172 is partially situated within the cylindrical tubing of column member 120 and optionally holding member 130. To lock an article situated on one or more article support members 200, cable 172 would be partially removed from the tubing of column member 120 and wrapped either around a portion of the article, or perhaps placed through an aperture of the article. Cable 172 is made of metal, a hardened plastic or any other material that is difficult to break. Optionally, to reduce wear, an optional plastic sheath 173 is placed over cable 172.

Cable 172 is prevented from being completely removed and disconnected from carrier 100 by (i) providing a channel 174 through which cable 172 can be pulled therethrough, and (ii) securely attaching a clamp 175 at one end 176 of cable 172. Channel 174 is created, for example, by placing of a pre-manufactured aperture within the cylindrical tubing of column member 120. By sizing clamp 175 to be greater in size than channel 174, cable 172 can only be partially removed from column member 120, not completely removed.

The opposite end 177 of cable 172 is adapted with cable lock 171. In this embodiment, cable lock 171 includes a tubular cable lock that operates in cooperation with a cable lock securing pin 178. In particular, upon insertion of securing pin 178 into an opening 179 of cable lock 171, a head portion 180 of securing pin 178 causes a securing flange 181 of cable lock 171 to rotate upward. Since a depressed region 182 follows head portion 180 of securing pin 178, securing flange 181 returns to its original state once head portion 180 is cleared. Thereafter, securing pin 178 cannot be removed from opening 179 without insertion of key 183 into a keyhole 184 of cable lock 171. Upon insertion, the rotation of key 183 causes the rotation of securing flange 181 as well. This allows cable lock 171 to become disconnected from securing pin 178.

Figure 10:
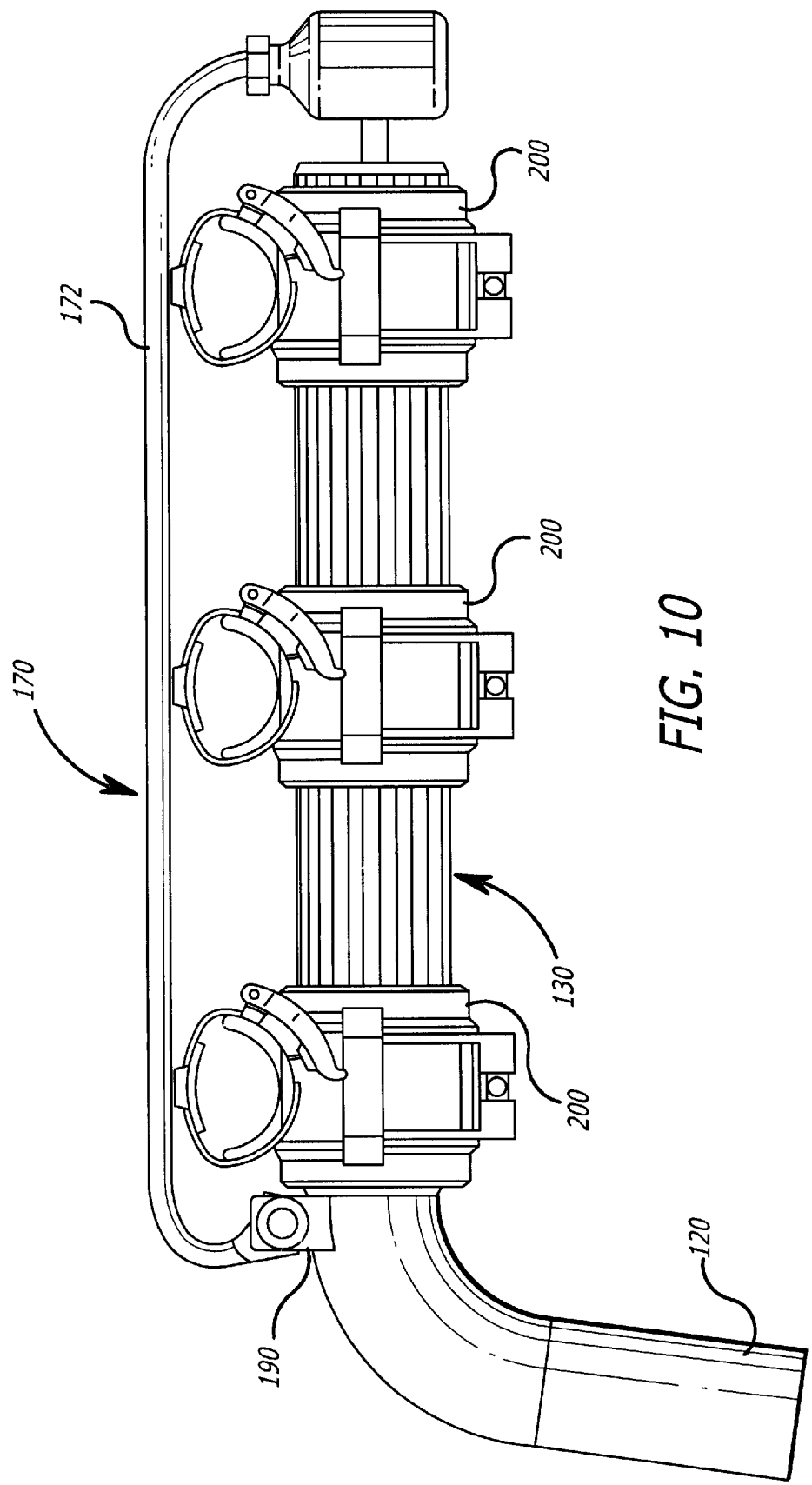
FIG. 10 is a second illustrative embodiment of the locking mechanism.

As shown in FIG. 10, it is contemplated that another embodiment of locking mechanism 170 may be employed. In this embodiment, locking cable 172 is secured to column member 120 through a securing device 190. Securing device 190 is situated just prior to grooved holding member 130. This would avoid internal placement of locking member 170.

Figure 5:
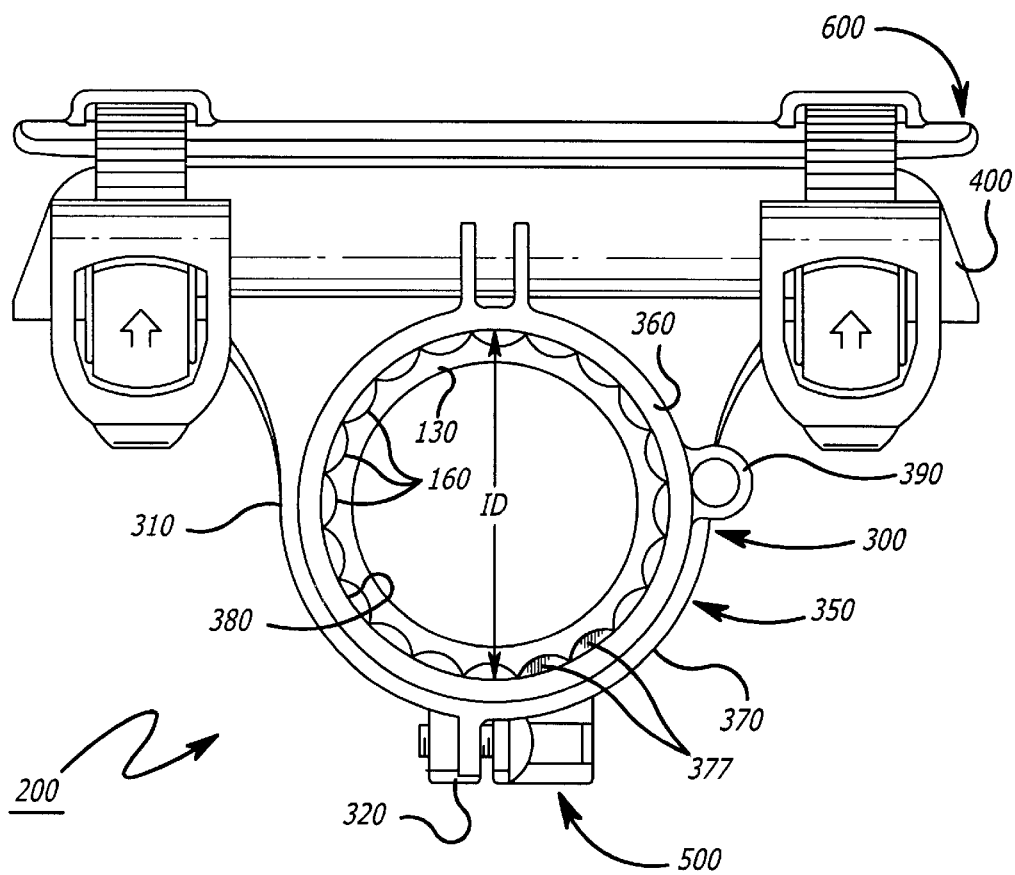
FIG. 5 is a first illustrative embodiment of an article support member of FIG. 2.

Referring now to FIGS. 5–7, a first embodiment of article support member 200 is shown. Article support member 200 comprises a collar 300, a tray 400, a collar fastening mechanism 500 and an article anti-sway mechanism 600. In one embodiment, article support member 200 is substantially made of a hardened plastic. This allows collar 300 and tray 400 to be molded together as a single structure. Instead of hardened plastic, it is contemplated that article support member 200 may be substantially made of metal in which collar 300 and tray 400 are molded together either as a single structure or attached together through adhesive, welding or any other type of fastening technique.

As shown in FIG. 5, an embodiment of collar 300 comprises a fixed curved collar portion 310 and a rotational curved collar portion 350. In particular, curved collar portion 310 includes an end 320 having an aperture 330 for collar fastening mechanism 500 (see FIG. 7). In this embodiment, curved collar portion 310 is permanently positioned while rotatable collar portion 350 is pivotal about a hinge 390. Rotatable collar portion 350 includes a stationary first segment 360 and a pivotal second segment 370 having an end 375 with an aperture 376 for collar fastening mechanism 500 (see FIG. 7). Thus, when placed in a closed state, rotatable collar portion 350 is positioned so that aperture 330 is generally aligned with aperture 376.

In addition, an inner surface 380 of second segment 370 is configured to generally interlock with outer surface 160 of holding member 130 while the remaining inner surface of collar 300 is held on holding member 130 by applied pressure. For example, in this embodiment, second segment 370 of release clamp 350 includes one or more protrusions 377 complementary with the orientation grooves 150 of holding member 130 of FIGS. 1 and 2. Of course, protrusions 377 can possess any geometric shape so long as it is complementary and adaptive to generally interlock with grooves 150. As a result, once article support member 200 is placed on holding member 130 and rotated as need to accommodate different types and structures of the articles, rotatable collar portion 350 is placed in a closed position to present article support member 200 from further unwanted rotation. Herein, when in a closed state, a diameter (ID) of inner surface 380 of collar 300 is measured to be slightly greater than the diameter of holding member 130 of FIG. 2 taken from its outer surface 160.

Referring to FIG. 6, tray 400 is placed along curved collar portion 310 and stationary 360 segment of rotatable collar portion 350 through buttress portions 410 and 420, respectively. These buttress portions 410 and 420 provide a stable structure to support an article. Tray 400 further includes a generally concave channel 430 which features a plurality of extensions 440 at its ends to prevent the article (not shown) from swaying and/or becoming dislodged during transport. It is contemplated that tray 400 may be configured in a half-rectangular shape to hold skis or in any different shape to hold the article(s). To further prevent swaying of the article during transport, a material (e.g., Kraton) having an acceptable coefficient of friction may be placed on channel 430 and/or one or more of extensions 440.

Referring now to FIG. 7, fastening mechanisms of article support member 200 include (i) collar fastening mechanism 500 joining collar portion 310 and release clamp 350 (see FIG. 5), and (ii) article anti-sway mechanism 600. An example of collar fastening mechanism 500 includes a quick release lever 510 which, when inserted through apertures 330 and 376 (see FIG. 5) and placed in a locked state provides positive fastening (e.g., pressure and interlocked protrusion(s)/groove(s)) of collar 300 on to holding member 130. When placed in an unlocked state, article support member 200 can be rotated and moved laterally along holding member 130.

Referring still to FIG. 7, an example of article anti-sway mechanism 600 includes a cap 610 which conforms with the curvature of channel 430 and is designed to rest over a portion of an article to prevent the article from being dislodged from channel 430. Cap 610 is secured by inserting fastening straps 620 (e.g., Velcro® straps, canvas straps, etc.) through strap inserts 630 placed on a top surface of cap 610.

Figure 8:
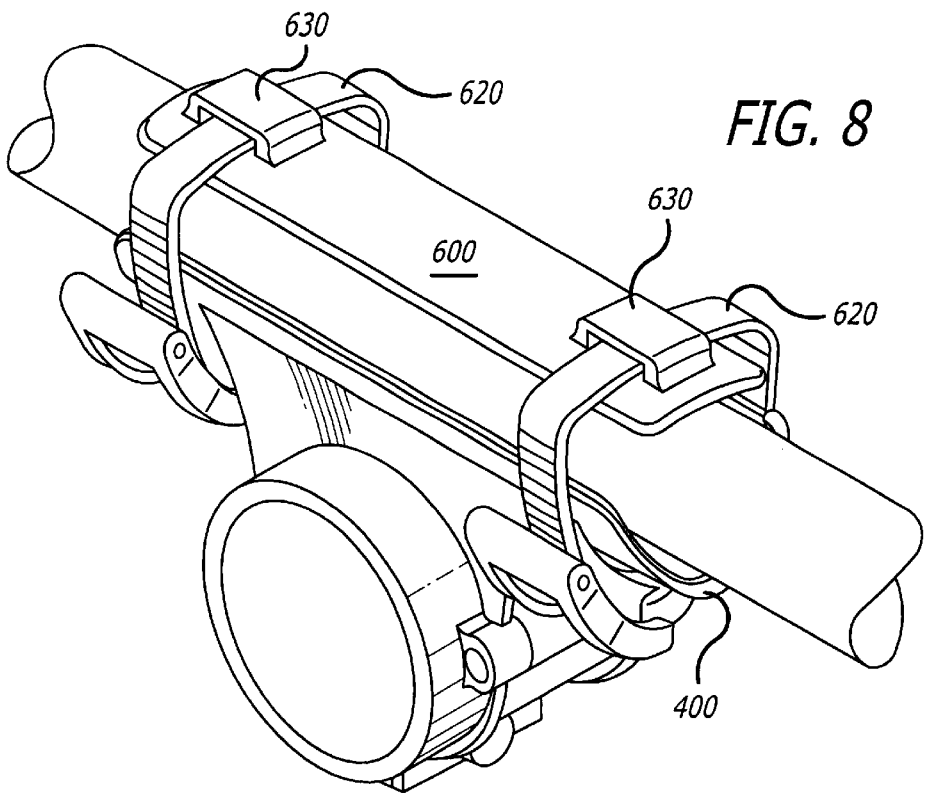
FIG. 8 is an illustrative embodiment of the article support member of FIG. 7 when placed in a locked state.
Figure 9:
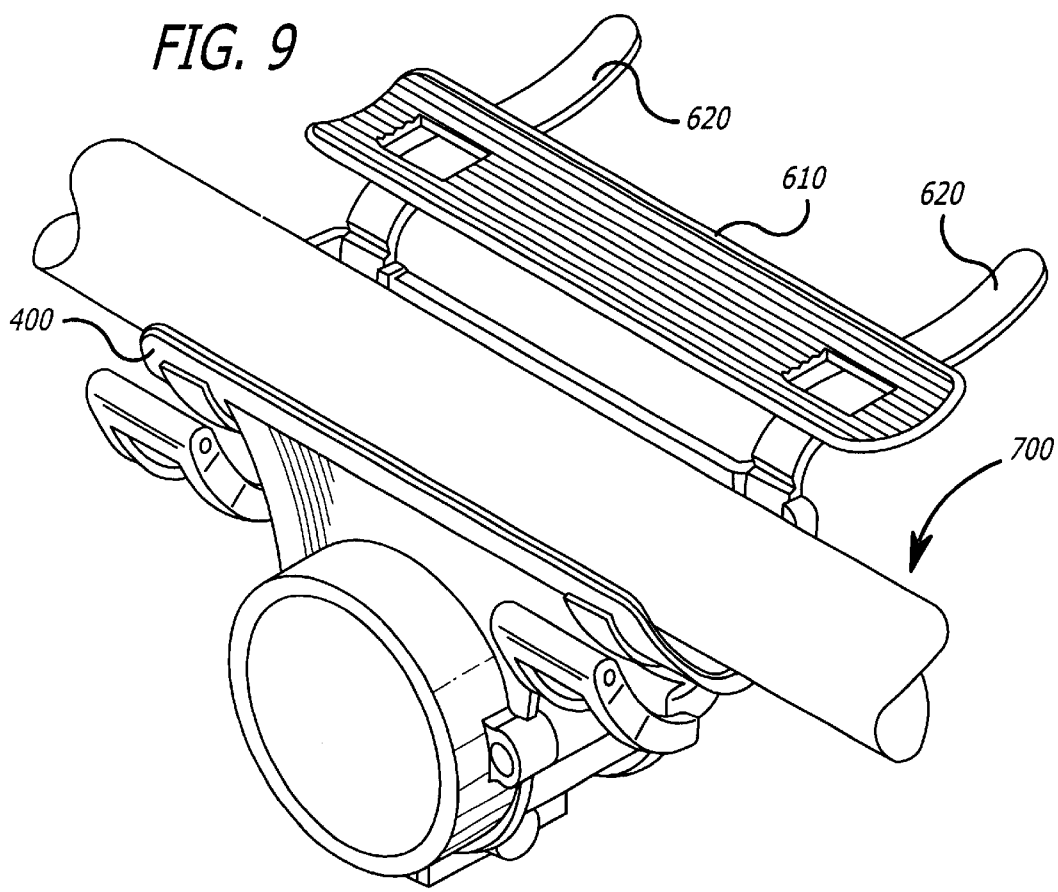
FIG. 9 is an illustrative embodiment of the article support member of FIG. 7 when placed in an unlocked state.

Thus, as shown in FIG. 8, in a locked state, cap 610 is positioned over an article resting in channel 430. Straps 620 are inserted through inserts 630 and fastened to ensure that cap 610 maintains the article (placed in tray 400) from becoming dislodged. In an unlocked state, as shown in FIG. 9, straps 620 are loosened so cap 610 does not rest above the channel to allow the article 700 (e.g., a top-tube of a sloped-tube bicycle) from being removed from the channel of tray 400.

Referring now to FIGS. 11–13, a second embodiment of article support member 200 is shown. Article support member 200 comprises a collar 700, a tray 800, a collar fastening mechanism 900. In this embodiment, article support member 200 is substantially made of a hardened plastic. This allows collar 700 and tray 800 to be molded together as a single structure, although collar 700 and tray 800 may be attached together through any attachment technique.

Referring now to FIG. 11, a cross-sectional view of a second embodiment of article support member 200 is shown. Article support member 200 comprises a collar 700 including a pair of curved, collar portions 710 and 720. These portions 710 and 720 are rotational about pins 740 and 741, respectively. Collar portion 710 includes an inner surface 730 with a general curvature complementary to holding member 130 of FIG. 2. Collar portion 710 includes one or more protrusions 750 placed on its inner surface 730 to engage orientation grove(s) 150 of holding member 130 or an insert placed over holding member 130. Collar portion 720 also includes one or more protrusions 760 on inner surface 730 for engaging orientation grooves 150. These protrusion(s) 750 and 760 act as the primary locking mechanism to prevent rotation of article support member 200 when securely placed on holding member 130 of FIG. 1. The collar portions 710 and 720 may be attached together through a quick return lever or any other device for attachment of two semi-rotational collars shown in FIGS. 5–7.

Referring now to FIGS. 11 and 12, tray 800 is placed along collar 700 through mid-section buttress portion 810. Buttress portion 810 provides a stable structure to support an article. Tray 800 further includes a generally concave channel 820 having sloping extensions 830 at its ends to prevent the article (not shown) from swaying and/or becoming dislodged during transport. To further prevent swaying of the article during transport, one or more strips of material (e.g., Kraton) 840 having an acceptable coefficient of friction may be placed along channel 820 and/or one or more of extensions 830. Also, a top portion 920 of pins 910 of collar fastening mechanism 900 protrudes from cut-out apertures 850 in material 840 to frictionally engage the article when positioned in channel 820. To avoid harming the finish of the article, top portion 920 of pins 910 is made of a smooth material such as hardened plastic.

Referring now to FIGS. 11–13, an embodiment of collar fastening mechanism 900 acting as a secondary locking mechanism to prevent rotation of article support member 200 with articles is shown. Collar fastening mechanism 900 includes spring-loaded pins 910 placing article support member 200 in a locked, non-rotational state when an article is placed within channel 830. More particularly, as shown, pin 910 is depressed when pressure is applied against its top portion 920, causing a spring 930 to be compressed. This also causes a bottom portion 940 of pin 910 to become engaged with outer surface 160 of holding member 130 of FIG. 2. For example, in this embodiment, bottom portion 940 of pin 910 is complementary with orientation grooves 150 of holding member 130 of FIG. 2. When the article is removed, pins 910 are placed in an unlocked state because spring 930 returns to a non-compressed state. As shown, pin 910 is in an unlocked state when its top portion 920 protrudes from a surface of channel 820 at a height substantially greater than evident in a locked state.

The present invention described herein may be designed in many different architectures and using many different components. While the present invention has been described in terms of various embodiments, other embodiments may come to mind to those skilled in the art without departing from the spirit and scope of the present invention. The invention should, therefore, be measure in terms of the claims that follow.

What is claimed is:

1. A carrier comprising:
  a holding member including a tubing with a plurality of orientation grooves; and
  an article support member coupled to the holding member, the article support member including
    a tray,
    a collar coupled to the tray, a portion of the collar being generally complementary to and engaging with a first orientation groove of the plurality of grooves associated with the holding member to prevent unwanted rotation of the tray, and
    a fastening member protruding though the tray to engage a second orientation groove of the plurality of grooves associated with the holding member for assisting in preventing unwanted rotation of the tray.

2. The carrier of claim 1, portion of the collar comprises at least one protrusion shaped complementary with the first orientation groove of the plurality of orientation grooves.

3. The carrier of claim 1, wherein a first end of the spring-loaded pin engages with the second orientation groove with a force is exerted against a second end of the spring-loaded pin protruding through the tray.

4. The carrier of claim 1, further comprising a locking mechanism including
   a plurality of cables each adapted for a claim at a first end and a lock at a second end.

5. The carrier of claim 1, wherein the portion of the collar further comprises a second rotational collar portion including at least one protrusion shaped complementary with a second orientation groove of the plurality of orientation grooves.

6. The carrier of claim 5, wherein the collar of article support member further includes release lever coupling the first curved, rotational collar portion to the second curved, rotational collar portion.

7. The carrier of claim 1, wherein the fastening member of the article support member includes a plurality of spring-loaded pins.

8. The carrier of claim 7, wherein at least two of the plurality of spring-loaded pins protrude from the tray separated by less than a diameter of the tubing.

9. The carrier of claim 1, wherein the fastening member of the article support member includes a pin.

10. The carrier of claim 9, wherein a first end of the spring-loaded pin engages with the second orientation groove when an article is placed in the tray.

11. The carrier of claim 10, wherein a second end of the spring-loaded pin adapted to be in contact with the article is made of a hardened plastic.

12. An article support member comprising:
    a tray;
    a collar integrated with the tray, the collar including means for preventing unwanted circular rotation of the article support member; and
    a plurality of pins positioned to protrude through the tray and adapted to operate as a secondary means for preventing rotation of the article support member when an article is placed on the tray.

13. The article support member of claim 12, wherein the collar further includes a curved rotational collar portion having at least one protrusion to engage with an orientation groove of a holding member of the carrier.

14. The article support member of claim 12, wherein each of the plurality of pins is spring-loaded.

15. The article support member of claim 12, wherein the collar further includes a plurality of pins insertable through the tray to engage with at least two orientation grooves of a holding member of the carrier when the article is placed in the tray.

16. The article support member of clam 15, wherein a first end of one of the plurality of pins engages with a corresponding orientation groove in response to a force applied by the article to a second end of the one of the plurality of pins.

17. An article support member comprising:
    a tray;
    a collar fixedly coupled to the tray, the collar including means for preventing unwanted rotation of the article support member when slideably attached to a holding member; and
    at least one pin positioned to protrude through the tray and adapted to operate as a secondary means for preventing rotation of the article support member when an article is placed on the tray.

18. The article support member of claim 17, wherein each of the plurality of pins is spring-loaded.

19. The article support member of claim 17, wherein the collar further includes a plurality of pins insertable through the tray to engage with at least two orientation grooves of a holding member of the carrier when the article is placed in the tray.

20. The article support member of clam 19, wherein a first end of one of the plurality of pins engages with a corresponding orientation groove in response to a force applied by the article to a second end of the one of the plurality of pins.

* * * * *